United States Patent [19]

Moriwake et al.

[11] Patent Number: 5,329,315
[45] Date of Patent: Jul. 12, 1994

[54] SPECIAL EFFECT GENERATOR HAVING PLURAL PROCESSORS SELECTIVELY CONNECTED AND ADDING TO A SIGNAL PROCESSED THEREBY AN ID SIGNAL REPRESENTING THE CONNECTING STATUS OF THE PROCESSORS

[75] Inventors: Katsuakira Moriwake; Shinichi Fukushima; Toshihiro Shiraishi, all of Kanagawa, Japan

[73] Assignee: Sony Corporation, Tokyo, Japan

[21] Appl. No.: 42,768

[22] Filed: Apr. 6, 1993

[30] Foreign Application Priority Data

Apr. 10, 1992 [JP] Japan .................................. 4-091205

[51] Int. Cl.⁵ .............................................. H04N 9/74
[52] U.S. Cl. .................................. 348/578; 348/473; 348/722
[58] Field of Search ............... 358/181, 185, 183, 182, 358/142, 146, 147, 310, 311, 86; 370/60; 395/163; 340/717; H04N 5/268, 5/262

[56] References Cited

U.S. PATENT DOCUMENTS

| 4,081,612 | 3/1978 | Hafner | 179/15 BA |
|---|---|---|---|
| 4,218,709 | 8/1980 | Baxter et al. | 358/181 |
| 5,150,212 | 9/1992 | Han | 358/147 |

FOREIGN PATENT DOCUMENTS

| 0251868 | 1/1988 | European Pat. Off. ..... H04N 5/268 |
| 0261893 | 3/1988 | European Pat. Off. . |
| 0402992 | 12/1990 | European Pat. Off. . |
| WO92/09172 | 5/1992 | PCT Int'l Appl. . |
| 2210531 | 6/1989 | United Kingdom . |

Primary Examiner—Victor R. Kostak
Assistant Examiner—Nathan J. Flynn
Attorney, Agent, or Firm—William S. Frommer; Alvin Sinderbrand

[57] ABSTRACT

A special effect generating apparatus having a plurality of processing units being connected each other, each of which includes a processing section for processing an input video signal according to a control signal, an identification signal generating section for generating an identification signal which identifies the processing unit or a condition of the processing unit, an adding section for adding the identification signal to a predetermined portion of an output video signal from the processing section, a detecting section for detecting the identification signal in an output video signal from an upstream processing section, and a monitoring section for monitoring a connecting status among the plurality of processing units or a condition of the processing units according to the identification signal detected by the detecting section.

6 Claims, 5 Drawing Sheets

SPECIAL EFFECT GENERATOR HAVING PLURAL PROCESSORS SELECTIVELY CONNECTED AND ADDING TO A SIGNAL PROCESSED THEREBY AN ID SIGNAL REPRESENTING THE CONNECTING STATUS OF THE PROCESSORS

BACKGROUND OF THE INVENTION

1. Field of the Invention

The present invention generally relates to special effect generating apparatus and, more particularly, is directed to a special effect generating apparatus suitably applied to a special effect generating apparatus that employs a digital multi-effector or the like, for example.

2. Description of the Prior Art

When a television broadcasting program, a video software or the like is formed, there is frequently required a special effect such that one image is formed by synthesizing a plurality of images.

As one example of the special effects by composing a plurality of images, the following one for displaying a three-dimensional image on a monitor screen has been known. That is, in this example, information representing a depth is added to each pixel of a plurality of images to be composed, then values of the information are compared among corresponding pixels of the plurality of images to be composed, and then pixels of the most foreground side among the plurality of images are displayed and the remaining pixels of the background side are hidden.

Figure 1:
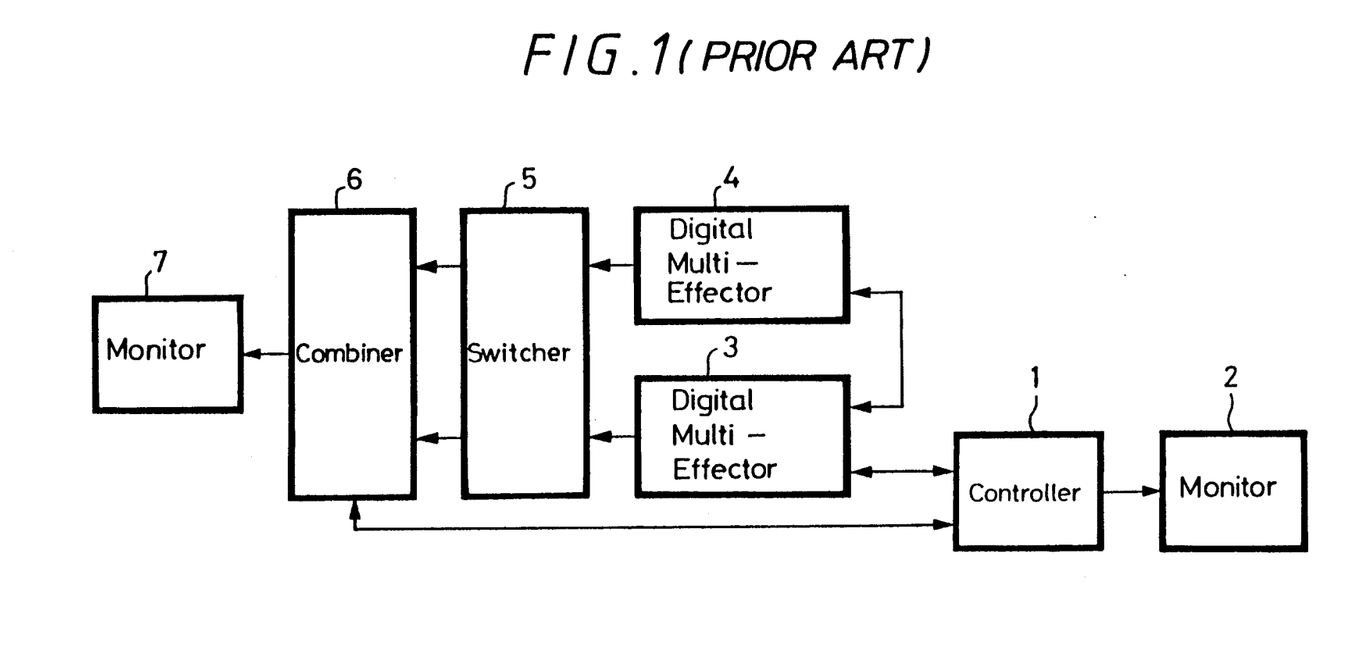
FIG. 1 shows in block form an arrangement of an example of conventional special effect generating apparatus.

As an example of special effect generating apparatus of this type for performing special effect processings to images, there has been proposed the arrangement shown in FIG. 1.

Referring to FIG. 1, a monitor 2 is connected to a controller 1 and further a digital video effector or digital multi-effector (hereinafter simply referred to as a DME) 3 for performing special effect processings as to image data or video data is connected to the controller 1. Another DME 4 is connected to the DME 3. Output terminals of the DMEs 3 and 4 are connected to input terminals of a switcher 5 for changing over the video data. Output terminals of the switcher 5 are connected to input terminals of a combiner 6 for combining video data of plural images into video data of one image and outputting it. One output terminal of the combiner 6 is connected to a monitor 7 and the other output terminal thereof is connected to the controller 1.

Operations of the thus constituted special effect generating apparatus will be explained. Firstly, when an operator operates an input unit such as a key board, mouse or track ball (not shown) to transmit a command to the controller 1, the controller 1 supplies, in response to the command, depth data (z data), key data (k data) and inputted video data or the like, for example, to the DME 3.

The DME 3, based on the z data, k data, video data and control data supplied from the controller 1, performs various special effect processings such that the video data is processed to form a designated graphic pattern or the like. Further, the z data, k data and video data supplied to the DME 3 are also supplied to the DME 4 through the DME 3 without being processed in the DME 3.

The DME 4, based on the z data, k data, video data and control data supplied from the controller 1, also performs various special effect processings such that the video data is processed to form a designated graphic pattern or the like. In this case, the signal outputted from the controller 1 is previously arranged by the designation of the operator so as to identify which of the DMEs 3 and 4 performs the processing based on a certain control signal. This arrangement is generally called a logical channel and so on.

Thus, when the operator operates the input unit to instruct the controller 1 so that the video data is processed to form a designated graphic pattern, both the DMEs 3 and 4 may be operated or only designated one of them may be operated depending on the setting condition performed by the operator as to the controller 1.

The outputs of the DMEs 3 and 4, that is, the z data, k data and video data are supplied to the switcher 5. The switcher 5 is a so-called routing switcher having a plurality of input terminals and output terminals. The switcher 5 determines the output terminals from which the data supplied from the DMEs 3 and 4 are outputted, respectively.

The output of the switcher 5, that is, the z data, k data and video data is supplied to the combiner 6. The combiner 6, for example, mixes the output of the switcher 5, that is, the video data supplied from the DMEs 3 and 4 based on the z data and k data which are also supplied from the DMEs 3 and 4.

The video data thus mixed by the combiner 6 is supplied to the monitor 7 and displayed on a monitor screen thereof as an image subjected to the special effect processing.

The assignee of this application has proposed in Japanese Patent Laid-Open Publication No. 2-329623 a special effect generating apparatus which is arranged in a manner that information representing a depth of an image is transmitted through a serial transmission line having the same standard as that for transmitting a digital signal.

In a broadcasting station, all of the units shown in FIG. 1 are not always disposed in the same room but sometimes disposed in different rooms separately. Further, the units shown in FIG. 1 are used by a plurality of operators so as to perform different procedures separately rather than used to perform a common procedure.

Particularly, in the broadcasting station, the connections among the units may be changed day by day by the switcher, so that it is impossible to know on the combiner side through which path inputted video data is applied to the combiner. Thus, the conventional apparatus has the disadvantage that in order to know the connection status among the units, the connection status of all of the units shown in FIG. 1 must be checked manually.

In particular, when the routing switcher shown in FIG. 1 is used, since the routing switcher is arranged so as to output a signal supplied to an input terminal thereof from a designated output terminal thereof, it takes much time to check from which unit the output signal of the switcher is outputted, disadvantageously.

While the explanation has been made as a case employing two DMEs and one switcher or the like in the example of FIG. 1, the special effect generating apparatus actually employs further more units. In this case, much time is required for troublesome procedures such as checking of the fault of the units and connections thereof, and further mistake of the checks may occur due to the many check items, and so mistake of the connections or the faulty in the broadcasting or the like may occur at a high probability.

OBJECTS AND SUMMARY OF THE INVENTION

Therefore, it is an object of the present invention to provide an improved special effect generating apparatus in which the aforementioned shortcomings and disadvantages encountered with the prior art can be eliminated.

More specifically, it is an object of the present invention to provide a special effect generating apparatus which can ascertain the connection status of units constituting the apparatus with simplified configurations and further ascertain paths and status of signals.

As an aspect of the present invention, there is provided a special effect generating apparatus for generating video special effects which comprises a plurality of processing units being connected each other, each of the processing units having a processing unit for processing an input video signal according to a control signal, an identification signal generating unit for generating an identification signal which identifies the processing unit or a condition of the processing unit and an adding unit for adding the identification signal to a predetermined portion of an output video signal from the processing unit, a detecting unit for detecting the identification signal in an output video signal from one of the plurality of processing units, and a monitoring unit for monitoring a connecting status among the plurality of processing units or a condition of the processing units according to the identification signal detected by the detecting unit.

According to the present invention, since, when outputting the information of the unit, an identification (ID) signal generated by the ID signal generating unit is added to the information of the unit, the present invention is advantageous in that the connection status of the units can be ascertain with the simplified configuration.

Further, according to the present invention, since at least the ID signal and the input/output information is added to the input information, the present invention is advantageous in that the paths and status of the signals as well as the connecting status of the units can be ascertain with the simplified configuration.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

A special effect generating apparatus according to the embodiment of the present invention will now be described with reference to FIGS. 2 to 5.

Figures 2, 2A:
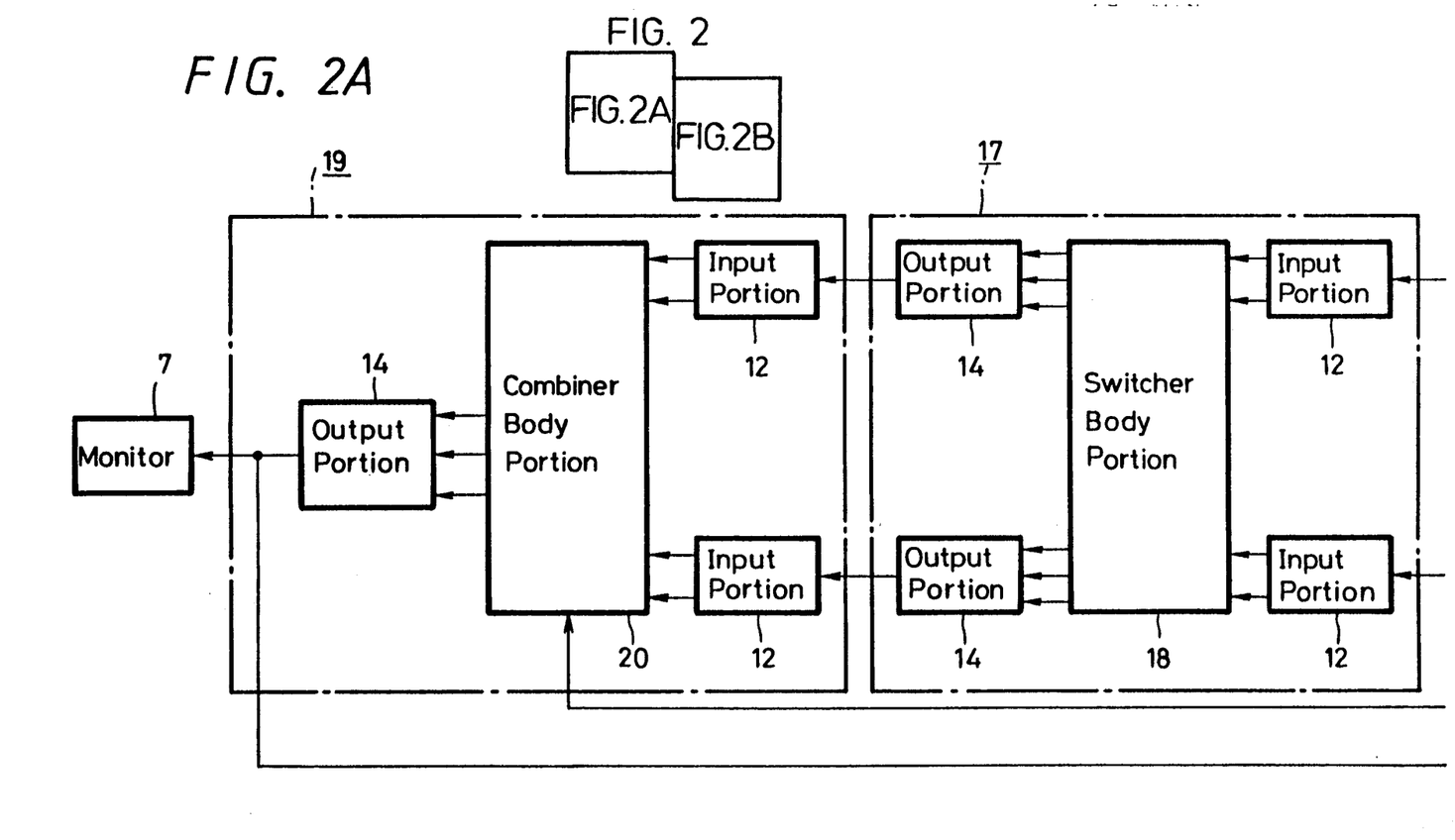
FIGS. 2, 2A, and 2B show in block form an arrangement of a special effect generating apparatus according to an embodiment of the present invention.
Figure 2B:
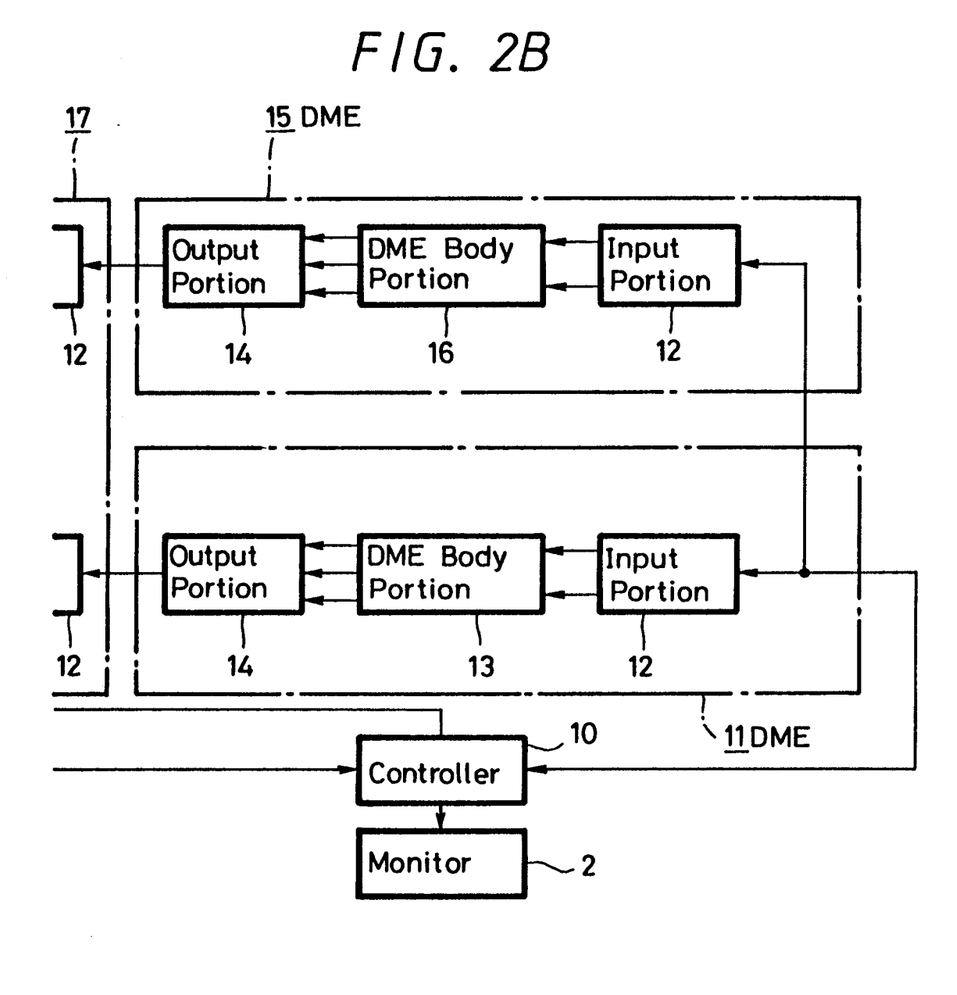

FIG. 2 shows an arrangement of the embodiment of the present invention. Referring to FIG. 2, a controller 10 supplies inputted video data, z data representing a depth of the video data and k data (key signal) serving as a change-over information or the like to a digital multi-effector (DME) 11 based on input information supplied from input unit such as a key board, mouse or track ball (not shown). In this case, the video data may be directly applied to the DME 11 or applied to the DME 11 through the controller 10 from a device (not shown) such as a D-1 or D-2 format type video tape recorder (VTR) or a converting device for converting an analog video signal to a digital signal.

The DME 11 is constituted by an input portion 12, a DME body portion 13 and an output portion 14. The input portion 12 forms a blanking period in the inputted video data, for example, and detects identification (ID) data of the video data. The DME body portion 13 subjects the video data to special effect processings in accordance with the z data and the k data supplied from the controller 10. As an example of the special effect processings employing the z data among these special effect processings, a processing for preparing such an image that video data is pasted on a desired three-dimensional graphic pattern or the like is well known. The output portion 14 adds the ID data to the video data supplied from the DME body portion 13 during the blanking period thereof and then outputs the video data.

The various data supplied to the DME 11 are also supplied to a DME 15 through a through terminal of the DME 11, for example. The through terminal passes input information without performing any process. The DME 15 is constituted like the DME 11 by an input portion 12, a DME body portion 16 and an output portion 14. The input portion 12 performs the blanking operation as to the inputted video data, for example, and detects ID data of the video data. The DME body portion 16 subjects the video data to the special effect processings in accordance with the z data and the k data supplied from the controller 10. The output portion 14 adds the ID data to the video data from the DME body portion 16 during the blanking period thereof and then outputs the video data.

The ID data is constituted, for example, by a code peculiar to a unit representing the unit, a code representing an input terminal or an output terminal through which an inputted signal passes, or a code representing a status of a unit or a status within the unit such as a failure or error status thereof or the like.

Logical channels can be allocated to the DMEs 11 and 15 by the controller 10, respectively. That is, logical channels are in advance allocated to the DMEs 11 and 15 by using the input unit of the controller 10. For example, the DME 11 and information for performing such a special effect processing that video data is pasted on a graphic pattern of a cone-like configuration may be allocated to a first channel, and the DME 15 and information for performing such a special effect processing that video data is pasted on a column-like configuration may be allocated to a second channel. In this case, by operating only one input unit of the controller 10, the DME 11 to which the first channel is allocated performs such the special effect processing that the video data is pasted on the graphic pattern of the cone-like configuration, and the DME 15 to which the second channel is allocated performs such the special effect processing that the video data is pasted on the graphic pattern of the column-like configuration, respectively.

The outputs of the DMEs 11 and 15, that is, the video data subjected to the special effect processing and the z and k data are supplied to a switcher 17.

As shown in FIG. 2, the switcher, for example, a routing switcher 17 is constituted by two input portions 12 having substantially the same construction and function as those of the input portions 12 of the DMEs 11 and 15, a switcher body portion 18, and two output portions 14 having substantially the same construction and function as those of the output portions 14 of the DMEs 11 and 15. Therefore, the explanation of the input portions 12 and the output portions 14 of the switcher 17 will be omitted.

The switcher body portion 18 has a plurality of input terminals and a plurality of output terminals (not shown) and is arranged, for example, so that a signal applied to an input terminal thereof designated by the switch operation or the like is outputted from a designated output terminal thereof. The switcher body portion 18 supplies various data such as the video data, z data and k data or the like supplied from the DMEs 11 and 15 through the input portions 12 thereof to the output potions 14 thereof and to a combiner 19 through a designated output terminal thereof (not shown).

The combiner 19 is constituted, as shown in FIG. 2, by two input portions 12 having substantially the same construction and function as those of the input portions 12 used in the DMEs 11 and 15 and the switcher 17, a combiner body portion 20, and an output portion 14 having substantially the same construction and function as those of the output portions 14 used in the DMEs 11 and 15 and the switcher 17. Therefore, the explanation of the input portions 12 and the output portion 14 of the combiner 19 will be omitted.

The combiner body portion 20, for example, mixes two video data supplied from the switcher 17 through the input portions 12 thereof based on the z data and the k data or the like supplied through the same routes, and supplies the mixed video data to the monitor 7 through the output portion 14 thereof to thereby display the mixed video date on a monitor screen of the monitor 7 as an image and supply, for example, the mixed video data to the controller 10. Then, the controller 10 detects the connection status of the respective units based on the video data supplied from the combiner 19, that is, the video data having ID data of the DMEs 11 and 15, switcher 17 and combiner 19 added in the blanking period thereof, and outputs the information representing the connection status to the monitor 2 to thereby display the present connection status of the respective units on the monitor screen.

The construction and operation of the input portion 12 provided at the respective units in FIG. 2 will be explained with reference to FIGS. 3 to 5.

Figure 3:
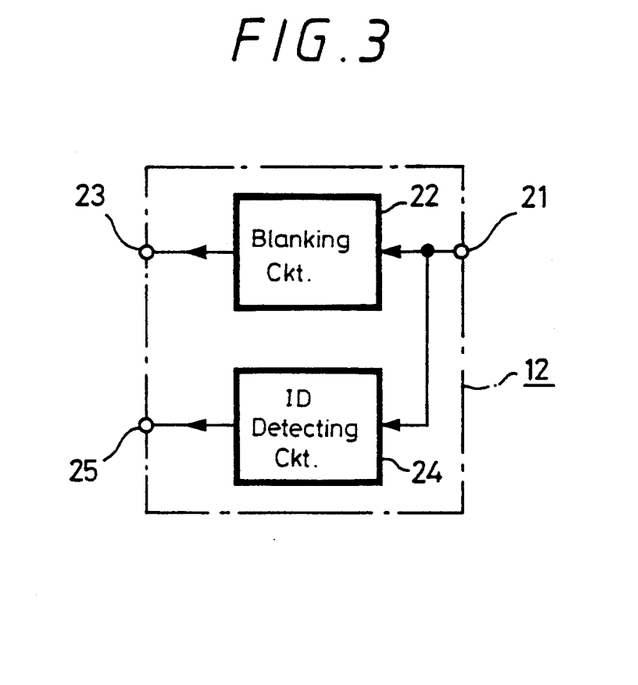
FIG. 3 shows in block form an arrangement of a main portion of an input portion shown in FIG. 2.

As shown in FIG. 3, the input portion 12 has a blanking circuit 22 for forming a blanking period in a signal supplied thereto through an input terminal 21 thereof and an ID detecting circuit 24 for detecting ID data from the inputted signal.

The operation of the input portion 12 will be explained bellow. Initially, the blanking circuit 22 forms the blanking period in the data, for example, the video data supplied from the external unit through the input terminal 21 and supplies the video data having the blanking periods to the body portion of the unit having this input portion 12 through an output terminal 23. The ID detecting circuit 24 detects the ID data added in the blanking period of the video data supplied from the external unit through the input terminal 21 and then supplies the result of the detection to the body portion of the unit having this input portion 12, for example, through an output terminal 25.

Figure 5A:
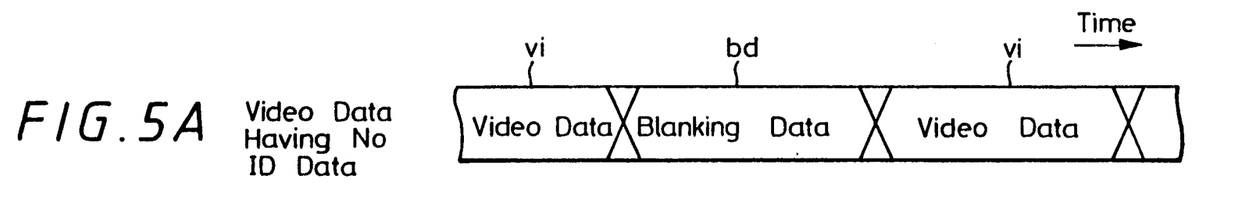
FIGS. 5A through 5F are timing charts illustrating data at various portions in FIG. 2, respectively.
Figure 5B:
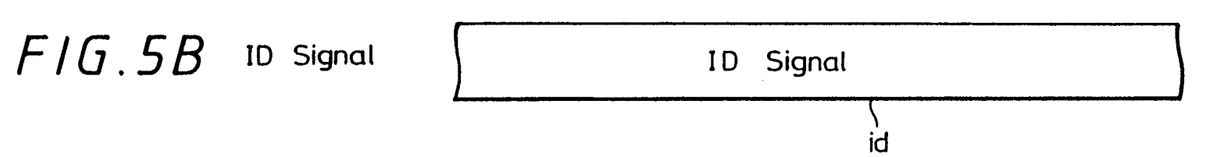
Figure 5C:
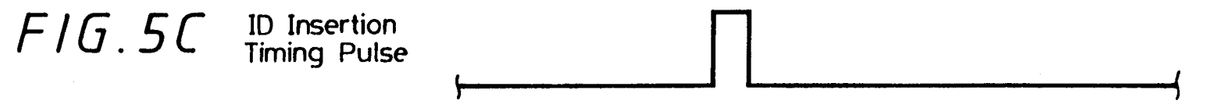
Figures 5D, 5E:
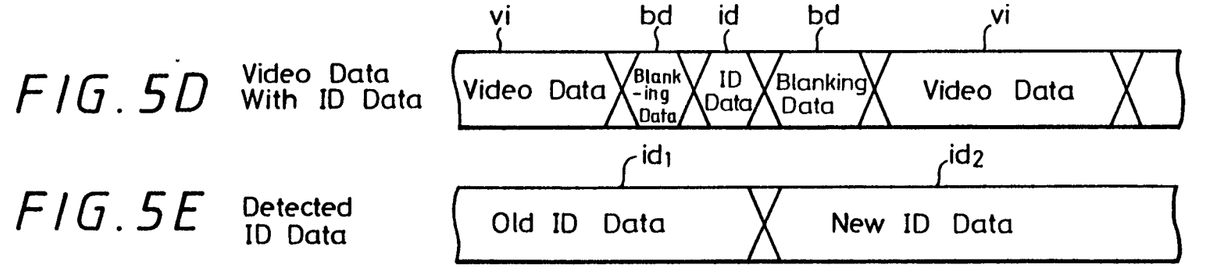
Figure 5F:
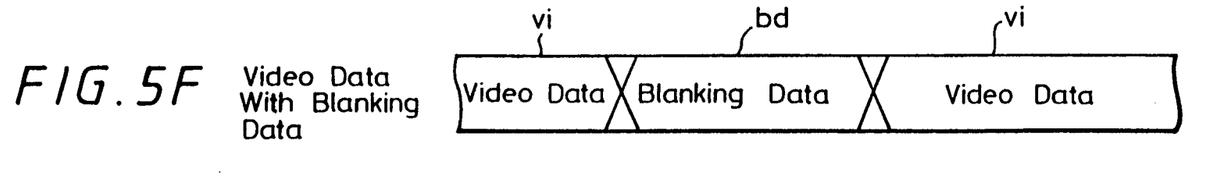

That is, the input portion 12 adds blanking data bd to the video data constituted by video data vi by the blanking circuit 22 as shown in FIG. 5F, and also detects the ID data added to the video data supplied from the external unit through the input terminal 21 to obtain old ID data id1 and new ID data id2 as shown in FIG. 5E.

Then, the construction and operation of the output portion 14 provided at the respective units in FIG. 2 will be explained with reference to FIG. 4.

Figure 4:
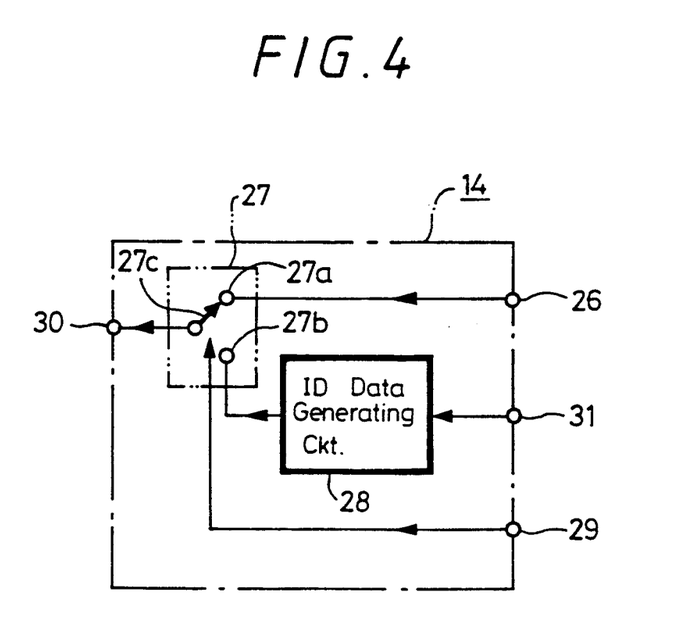
FIG. 4 shows in block form an arrangement of a main portion of an output portion shown in FIG. 2.

As shown in FIG. 4, the output portion 14 has an ID data generating circuit 28 for generating ID data based on set data supplied from the body portion of the unit having this output portion through an input terminal 31, and a switch 27 for selectively outputting the ID data from the ID data generating circuit 28 and the video data supplied through an input terminal 26 in accordance with a switching signal supplied from the body portion through an input terminal 29.

The operation of the output portion 14 will be explained bellow. The ID data generating circuit 28 generates the ID data based on the set data supplied from the body portion of the unit having this output portion 14 through the input terminal 31, and then supplies the ID data to a fixed contact 27b of the switch 27. Further, the video data supplied from the body portion of the unit having this output portion 14 through the input terminal 26 is supplied to another fixed contact 27a of the switch 27. A movable contact 27c of the switch 27 is selectively connected to one of the fixed contacts 27a and 27b in accordance with the switching signal supplied from the body portion of the unit having this output portion 14 through the input terminal 29, so that, for example, the ID data is added to the video data in the blanking period thereof which is formed in the input portion 12 and then the video data with the ID data is supplied to the external unit through an output terminal 30.

That is, the video data constituted by the video data vi and the blanking data bd shown in FIG. 5A supplied from the body portion of the unit having this output portion 14 is supplied to the fixed contact 27a of the switch 27 through the input terminal 26 shown in FIG. 4. Simultaneously, an ID signal id shown in FIG. 5B is supplied from the ID data generating circuit 28 to the fixed contact 27b of the switch 27.

In this case, an ID insertion timing pulse or the switching signal such as shown in FIG. 5C supplied from the body portion of the unit having this output portion 14 or the controller 10 is supplied to the switch 27, so that the ID signal shown in FIG. 5B is added to the video data during a period in which the insertion timing pulse shown in FIG. 5C is at a high level "1" while the video data represents the blanking data bd as shown in FIG. 5A. Thus, the video data to which the ID data id is added as shown in FIG. 5D is outputted from the output portion. In this embodiment, the video data supplied from the combiner 19 becomes data to which the ID data of the DMEs 11 and 15, ID data of the switcher 17 and ID data of the combiner 19 are sequentially added during the blanking period thereof.

This embodiment may be modified, for example, in a manner that the ID data is removed from the video data supplied to the monitor 7 from the combiner 19, and further only video data is removed from the video data supplied from the combiner 19 to the controller 10, that is, only the ID data is supplied to the controller 10.

As described above, since the embodiment is arranged in a manner that, in each of the DMEs 11 and 15, switcher 17 and combiner 19, the input portion 12 for forming the blanking period in the video data and detecting the ID data included in the blanking period of the video data is provided, and the output portion 14 for adding the ID data to the video data during the blanking period thereof is provided, and further the controller 10 detects the ID data included in the output data of the combiner 19 to thereby display the connection status of the respective units on the monitor 2, it is possible to ascertain the connection status among the respective units without performing troublesome checking procedure of the connection status of the units.

While, in the above-described embodiment, an operator operating the controller 10 checks the connection status of the units, the respective units constituting the system shown in FIG. 2 may not be disposed in the same room but may be disposed in different rooms separately as described above.

For example, only the combiner 19 may be disposed away from other units. In order to cope with this case, the combiner 19 may be added with a monitor such as a liquid crystal display or the like for displaying the connection status or a Circuit or program for displaying the connection status on a monitor which is provided at the combiner in advance. Then, the connection status, for example, a connection chart may be displayed on the screen of the monitor or the liquid crystal display of the combiner 19 based on the ID data added to the video data during the blanking periods thereof in a manner that names of the units and numbers of the terminals or the like are displayed in blocks of the connection chart representing the respective units.

In this case, an operator of the combiner 19 can surely grasp paths of the video data and the connection status by looking at the connection status displayed on the monitor.

In addition to the combiner 19, each of the DMEs 11 and 15 and the switcher 17 may be provided with a monitor so as to display thereon the connection status and the paths of the video data up to the unit itself.

Further, while, in the above-described embodiment, the ID data is added to the video data, the ID data may be added to the z data, k data or other data, for example. In this case, the same technical advantage as the case where the ID data is added to the video data can be obtained when the ID data is added to any one of the z data, k data and other data.

Furthermore, while, in the above-described embodiment, the explanation has been made about the special effect generating apparatus having the controller 10, DMEs 11 and 15, switcher 17 and combiner 19, this arrangement shows only one example in the broadcasting station. That is, the special effect generating apparatus in the actual broadcasting station includes further more units connected to the switcher 17 and also includes many units such as VTRs for outputting video data as source data connected thereto.

In this case, the checking procedure of the connection status and so on becomes more complicated and takes much time. However, since the input portion 12 and the output portion 14 are provided in each of the units so as to display the connection status and the paths of the video data up to the unit itself and further the connection status and the paths up to the unit itself are displayed at a unit requiring the monitoring of the connection status, the connection status and the paths can be indicated simply and quickly at a required portion even if the number of the units becomes larger. Further, since the connection status is indicated at the units, it can be quickly known, for example, which terminal of the unit required to be used is empty and which path is empty at present, so that the usage and management of the units can be performed smoothly.

If the above-described embodiment is modified, for example, in a manner that the ID data includes data representing conditions of the units and sates of signals in the units, operating states such as failure or error of the respective units constituting the system can be displayed on the screen of the monitor 2 or screens of the monitors provided at the units such as the combiner 19 or the like.

Thus, in the system having complicated and large arrangement, if the special effect generating apparatus can not attain its function at a path due to failure, error or the like, then it takes much time and needs troublesome procedure to check the connection status of the respective units and conditions thereof so as to know the cause thereof. However, according to the special effect generating apparatus to which the present invention is applied so as to monitor the operating status of the respective units, the aforesaid problems can be eliminated without requiring the troublesome procedures and much time.

As set out above, according to the present invention, since, when outputting the information of the unit itself to the outside, ID data generated by the ID data generating circuit is added to the information of the unit itself, the present invention is advantageous in that the connection states of the units themselves can be ascertained with the simplified configuration.

Further, according to the present invention, since at least the ID information and the input/output information are added to the input information, the present invention is advantageous in that the paths and states of the signals as well as the connection status of the units can be ascertain with the simplified configuration.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A special effect generating apparatus for generating video special effects comprising:
a plurality of processing units being connected to each other, each of said processing units having processing means for processing an input video signal according to a control signal, identification signal generating means for generating an identification signal which identifies said processing unit or a condition of said processing unit and adding means for adding said identification signal to a predetermined portion of an output video signal from said processing means;

detecting means for detecting said identification signal in an output video signal from one of said plurality of processing units; and monitoring means for monitoring a connecting status among said plurality of processing units or a condition of said processing units according to said identification signal detected by said detecting means.

2. A special effect generating apparatus according to claim 1, wherein said plurality of processing units are a digital video effector, a routing switcher and a combiner.

3. A special effect generating apparatus for generating video specific effects comprising:

a plurality of processing units being connected to each other, each of said processing units having processing means for processing an input video signal according to a control signal, identification signal generating means for generating an identification signal which identifies said processing unit or a condition of said processing unit, adding means for adding said identification signal to a predetermined portion of an output video signal from said processing means and detecting means for detecting said identification signal in an output video signal from upstream processing units; and monitoring means for monitoring a connecting status among said plurality of processing units or a condition of said processing units according to said identification signal detected by said detecting means.

4. A special effect generating apparatus according to claim 3, wherein said plurality of processing units are a digital video effector, a routing switcher and a combiner.

5. A special effect generating apparatus having a plurality of processing units being connected to each other, each of said processing units comprising:

processing means for processing an input video signal according to a control signal;

identification signal generating means for generating an identification signal which identifies said processing unit or a condition of said processing unit;

adding means for adding said identification signal to a predetermined portion of an output video signal from said processing means;

detecting means for detecting said identification signal in an output video signal from upstream processing units; and monitoring means for monitoring a connecting status among said plurality of processing units or a condition of said processing units according to said identification signal detected by said detecting means.

6. A special effect generating apparatus according to claim 5, wherein said plurality of processing units are a digital video effector, a routing switcher and a combiner.

* * * * *